(12) United States Patent
Komatsu et al.

(10) Patent No.: US 7,136,259 B2
(45) Date of Patent: Nov. 14, 2006

(54) FRAME STRUCTURE AND FLEXIBLE DISK DRIVE HAVING THE SAME

(75) Inventors: Hisateru Komatsu, Tendo (JP); Makoto Takahashi, Obanazawa (JP); Noriyuki Kobayashi, Tendo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 302 days.

(21) Appl. No.: 10/396,594

(22) Filed: Mar. 25, 2003

(65) Prior Publication Data

US 2003/0184910 A1    Oct. 2, 2003

(30) Foreign Application Priority Data

Mar. 26, 2002   (JP)   ............... 2002/084771

(51) Int. Cl.
  G11B 33/12    (2006.01)
  G11B 19/20    (2006.01)
(52) U.S. Cl. ..................... 360/99.02; 720/630
(58) Field of Classification Search ............. 360/99.01, 360/99.02; 720/628, 630, 634, 639
See application file for complete search history.

(56) References Cited

U.S. PATENT DOCUMENTS

| | | | | | |
|---|---|---|---|---|---|
| 5,649,442 A | * | 7/1997 | Yoshikawa et al. | ............ | 72/254 |
| 5,831,789 A | * | 11/1998 | Nishikawa | ............... | 360/99.02 |
| 5,870,248 A | * | 2/1999 | Akutsu et al. | ........... | 360/99.04 |
| 6,816,337 B1 | * | 11/2004 | Mukaijima et al. | ...... | 360/97.01 |
| 2003/0174438 A1 | * | 9/2003 | Komatsu et al. | ......... | 360/99.01 |
| 2004/0184185 A1 | * | 9/2004 | Komatsu et al. | ......... | 360/99.01 |

FOREIGN PATENT DOCUMENTS

| | | |
|---|---|---|
| JP | 2576475 B2 | 4/1988 |
| JP | 7-41746 | 7/1995 |
| JP | 2001-101854 | 4/2001 |

* cited by examiner

Primary Examiner—Brian E. Miller
(74) Attorney, Agent, or Firm—Frishauf, Holtz, Goodman & Chick, P.C.

(57) ABSTRACT

In order to provide a positioning mechanism that can be processed easily and accurately by press forming and a frame structure having the same, especially a main frame and a method of manufacturing the same, the invention provides a frame structure of the flexible disk drive including a pair of projections fitted into a pair of corresponding positioning holes on the inserted flexible disk. The pair of projections is formed by cutting and raising.

4 Claims, 15 Drawing Sheets

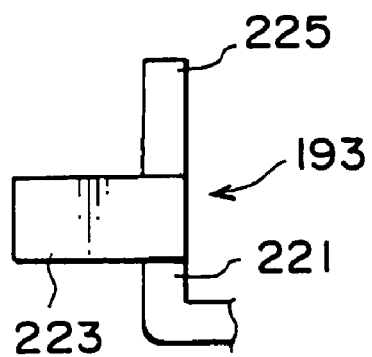
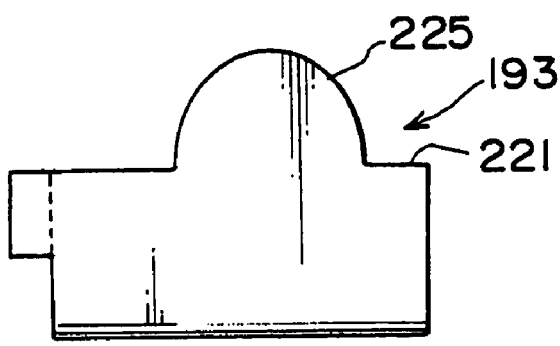
FIG. 15A   FIG. 15B
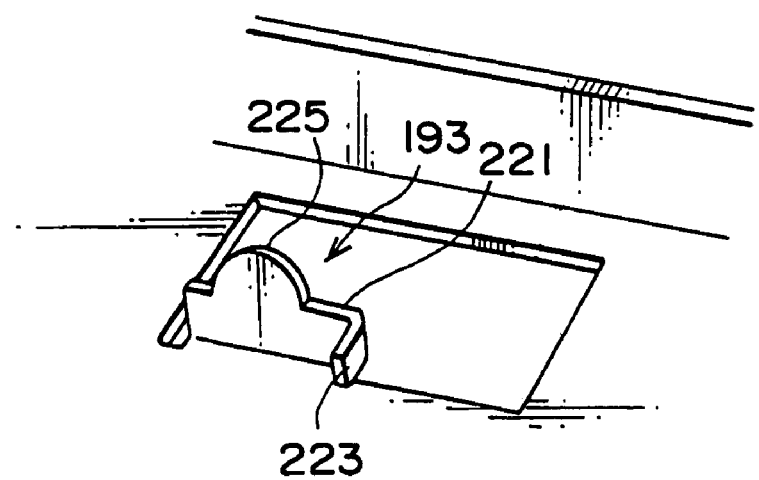
FIG. 15C

FRAME STRUCTURE AND FLEXIBLE DISK DRIVE HAVING THE SAME

This application claims priority to prior application JP 2002-84771, the disclosure of which is incorporated herein by reference.

BACKGROUND OF THE INVENTION

1. Field of the Invention

The present invention relates to a flexible disk drive, FDD, for writing and reading data on a flexible disk, FD, and, more specifically, to a positioning mechanism for the flexible disk, which is stored in a case.

2. Description of the Related Art

As is well known, a flexible disk drive is a device for writing and recording data on a disk-shaped magnetic recording medium, that is, a flexible disk (hereinafter also referred to as a "medium") inserted therein. The flexible disk drive is installed in mobile electronic equipment, such as laptop computers, notebook computers, and notebook word processors.

The flexible disk drive of this type includes a pair of upper and lower magnetic heads for reading data from/writing data to a magnetic recording medium in a flexible disk, a carriage assembly for supporting the magnetic heads at the extremity thereof so as to be capable of moving in a predetermined radial direction with respect to the flexible disk, a stepping motor for moving the carriage assembly along the predetermined radial direction, and a DD (direct drive) motor such as a spindle motor for rotating the magnetic recording medium in the flexible disk while holding the same.

The flexible disk inserted into the flexible disk drive is held on a disk table in a state in which the revolving shaft coincides with the center axis of the flexible disk. The disk table is supported so as to be rotatable on the surface of a main frame. The disk table is rotated by the spindle motor, which is mounted in a recess formed on the main frame, whereby the magnetic recording medium in the flexible disk rotates. A control printed circuit board on which a number of electronic components are mounted is attached to the underside of the main frame.

The stepping motor is fixed to a sidewall of the main frame on the underside. The stepping motor drives the carriage assembly linearly along the radial direction.

The flexible disk drive in the related art further includes an eject plate for ejecting the inserted flexible disk, and a holder for storing the inserted flexible disk. The main frame, the eject plate, and the disk holder are formed by punching, press forming, or bending metal plates.

The flexible disk in the related art includes a plastic case having a case body and a shutter, and a flexible disk body including a hub at the center thereof. The flexible disk is accommodated in the plastic case. The case body of the flexible disk has positioning holes on both sides near one end thereof, one of which is circular and the other one of which is oval.

In the related art, positioning of the flexible disk inserted into the flexible disk drive has been performed by aligning the positioning holes on the flexible disk with dowels formed on the main frame for positioning the flexible disk.

As described above, the main frame of the flexible disk drive in the related art is formed by press forming metallic plates such as steel plates. However, most frames are formed by press forming, as in the case of the flexible disk drive described above, and thus formation of the dowel for positioning the flexible disk by a drawing process is very difficult.

SUMMARY OF THE INVENTION

Accordingly, it is an object of the invention to provide a frame structure having a positioning mechanism that can be processed easily and accurately by press forming.

It is another object of the present invention to provide a flexible disk drive having the above-described frame structure.

It is still another object of the invention to provide a method of manufacturing the above-described frame structure.

According to one aspect of the present invention, there is provided a frame structure of a flexible disk drive which includes a main frame, a lower cover for covering the lower surface of the main frame, and an eject plate capable of sliding with respect to the main frame. In the frame structure, the main frame includes a pair of projections fitted to a pair of positioning holes on an inserted flexible disk. The pair of projections is formed by cutting and raising.

According to another aspect of the present invention, there is provided a flexible disk drive including the above-described frame structure.

According to still another aspect of the invention, there is provided a method of manufacturing a frame structure of the flexible disk drive including a step of forming positioning projections by cutting and raising in the lateral direction and in the fore-and-aft direction when punching and bending a metallic plate by press forming.

BRIEF DESCRIPTION OF THE DRAWINGS

FIGS. 14A, 14B, and 14C are views showing one positioning mechanism provided on the main frame, in which FIG. 14A is a front view, FIG. 14B is a side view, and FIG. 14C is a perspective view, respectively; and FIGS. 15A, 15B, and 15C are views showing another positioning mechanism provide on the main frame, in which FIG. 15A is a front view, FIG. 15B is a side view, and FIG. 15C is a perspective view, respectively.

DESCRIPTION OF THE PREFERRED EMBODIMENTS

Before describing the embodiments of the invention, a flexible disk drive in the related art will be described with reference to FIGS. 1 to 8 in order to facilitate understanding of the invention.

Figure 1:
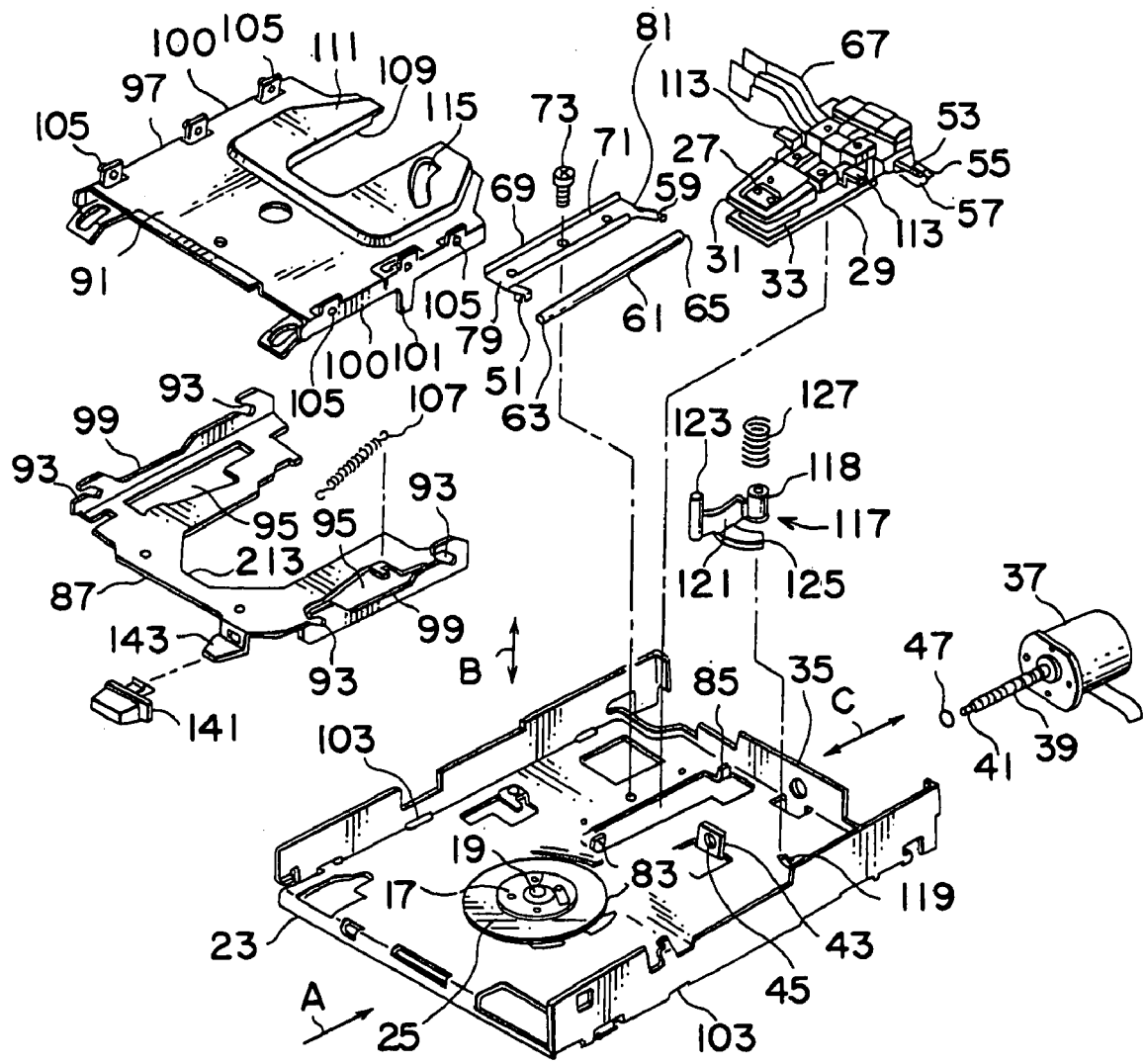
FIG. 1 is an exploded perspective view showing a principal portion of a flexible disk drive of the related art.
Figure 2:
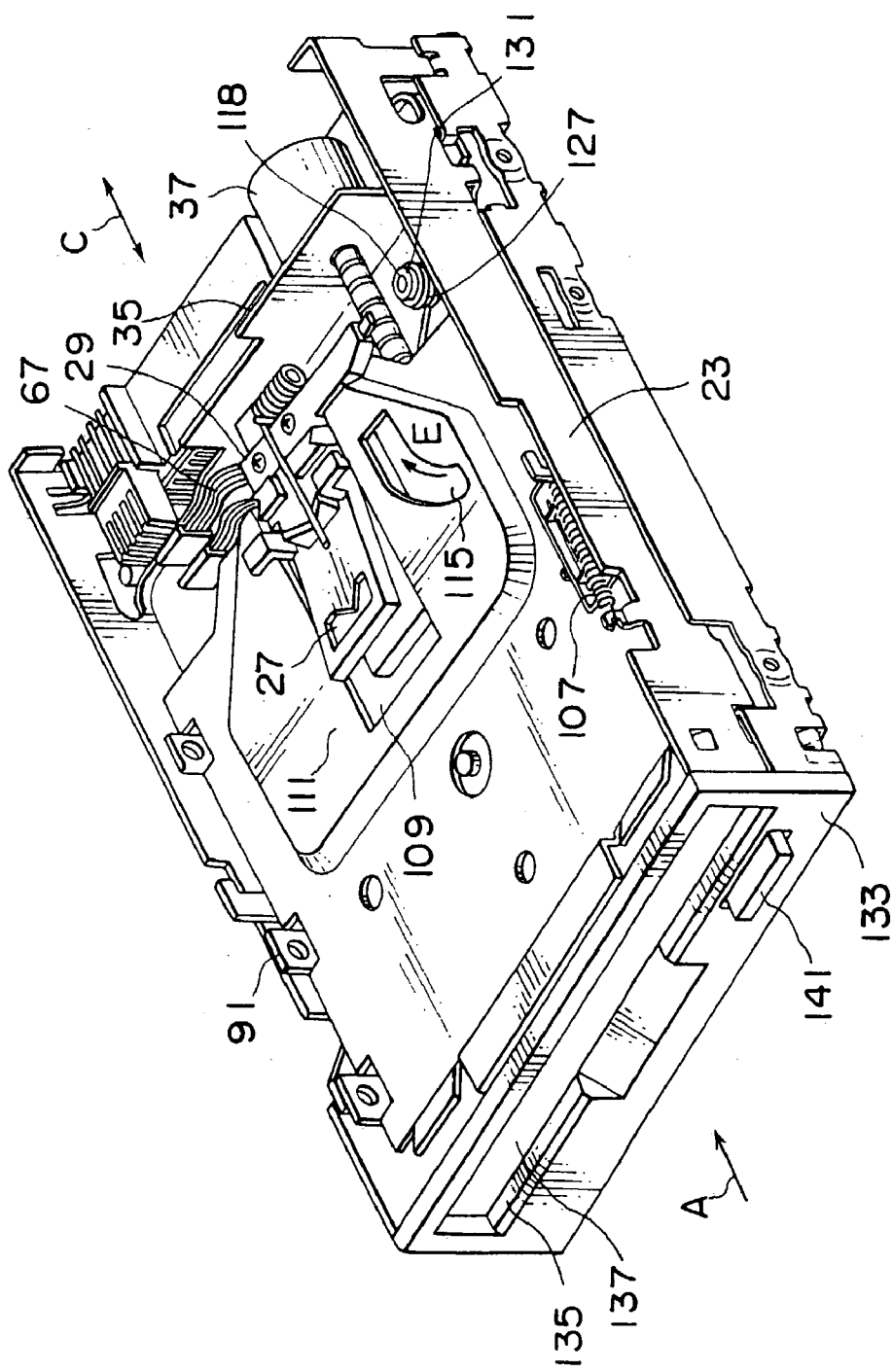
FIG. 2 is a general perspective view of the flexible disk drive shown in FIG. 1 when viewed obliquely from the front.

Referring first to FIGS. 1 and 2, a 3.5-inch flexible disk drive having a frame structure of the related art will be described.

The flexible disk drive shown in FIGS. 1 and 2 is a device for driving a 3.5-inch flexible disk. The flexible disk is inserted into the flexible disk drive from a direction shown by an arrow A in FIGS. 1 and 2. The inserted flexible disk is held on a disk table 17 in a state in which the revolving shaft 19 thereof coincides with the central axis of the flexible disk. As described later, the disk table 17 is rotatably supported on the surface of a main frame 23. Therefore, the axial direction B of the revolving shaft 19 of the disk table 17 is parallel to the thickness direction of the main frame 23. The disk table 17 is rotated by a spindle motor (DD motor) 25 mounted in a recess of the main frame 23, as is described later, whereby a magnetic recording medium in the flexible disk rotates. A printed circuit board (not shown) has a number of electronic components mounted thereon and is attached on the underside of the main frame 23.

The flexible disk drive has a pair of upper and lower magnetic heads 27, only the upper magnetic head is shown in the figure, for reading data from and writing data to the magnetic recording medium in the flexible disk. The magnetic head 27 is supported at the extremity thereof by a carriage assembly 29 provided on the underside of the flexible disk drive. In other words, the carriage assembly 29 has an upper carriage 31 and a lower carriage. The upper carriage 31 supports the upper magnetic head 27. The lower carriage 33 supports the lower magnetic head. The carriage assembly 29 is disposed on the main frame 23 at a certain distance from the main frame 23. The carriage assembly also supports the magnetic head 27 at the extremity thereof so as to be movable along a predetermined radial direction, corresponding to a direction shown by an arrow C in FIGS. 1 and 2, with respect to the flexible disk.

A stepping motor 37 is supported on a sidewall 35 of the main frame 23 on the underside thereof. The stepping motor 37 drives the carriage assembly 29 linearly along the predetermined radial direction C. More specifically, the stepping motor 37 has a revolving shaft or drive shaft 39 extending in parallel with the predetermined radial direction C, and the revolving shaft 39 has a male thread. The extremity 41 of the revolving shaft 39 passes through a hole 45 formed on a bent portion 43 extending vertically from the surface of the main frame 23 by cutting and raising, and includes a steel ball 47. The hole 45 and the steel ball 47 constrain the revolving shaft 39 so as to extend in parallel with the predetermined radial direction C, and the extremity 41 thereof is rotatably supported.

On the other hand, the carriage assembly 29 includes an arm 53 extending from the lower carriage 33 to the revolving shaft 39, and an extremity 55 of the arm 53 engages the recesses of the male thread on the revolving shaft 39. On the other hand, a spring 57 extends from the lower carriage 33 substantially in parallel with the arm 53. In other words, the revolving shaft 39 of the stepping motor 37 is interposed between the arm 53 and the spring 57.

Therefore, when the revolving shaft 39 of the stepping motor 37 rotates, the extremity 55 of the arm 53 moves along the recess of the male thread on the revolving shaft 39, whereby the carriage assembly 29 moves along the predetermined radial direction C. Therefore, the stepping motor 37 serves as a drive unit for linearly moving the carriage assembly 29 along the predetermined radial direction C.

Since the revolving shaft 39 of the stepping motor 37 is provided on one side of the carriage assembly 29, one of the sides of the carriage assembly 29 has the revolving shaft 39 and is movably supported by the revolving shaft 39 at a certain distance from the main frame 23. However, the revolving shaft 39 cannot support the entire part of the carriage assembly 29 at a certain distance from the surface of the main frame 23 by itself. Therefore, a guide bar 61 supports and guides the other side of the carriage assembly 29. The guide bar 61 is provided on the opposite side of the carriage assembly 29 to the revolving shaft 39 of the stepping motor 37. The guide bar 61 extends in parallel with the predetermined radial direction C, and is fixed at one end 63 and the other end 65 on the surface of the main frame 23 in a manner to be described later, so as to guide the carriage assembly 29 along the predetermined radial direction C. As a consequence, the entire portion of the carriage assembly 29 is maintained at a certain distance from the surface of the main frame 23.

A flexible printed circuit (FPC) 67 extends from the carriage assembly 29 toward the guide bar 61, and the FPC 67 is electrically connected to the main printed circuit board (not shown) attached to the underside of the main frame 23.

The guide bar 61 is clamped by a guide bar clamp 69 on the surface of the main frame 23. The guide bar clamp 69 is fixed at its central portion to the surface of the main frame 23 by a self-binding screw 73. More specifically, the guide bar clamp 69 includes a rectangular fixing member 73. The rectangular fixing member is slightly longer than the guide bar 61, and has a hole of a size that allows passage of a screw shaft of the self-binding screw 73 at substantially the center thereof. A pair of arms 51 and 59 extends from one end 79 and the other end 81 of the rectangular fixing member 73 and clamps the guide bar 61 at one end 63 and the other end 65 thereof.

The guide bar clamp 69 simply clamps the guide bar 61, and thus the guide bar 61 cannot be fixed on the surface of the main frame 23. Therefore, a pair of positioning members is necessary for constraining the positions of the two ends 63 and 65 of the guide bar 61. The pair of positioning members employed here is a pair of bent portions 83 and 85 formed by cutting a portion of the main frame 23 and raising the cut portion toward the top surface.

The lower carriage 33 of the carriage assembly 29 also serves as a supporting frame for supporting the carriage assembly 29 so as to be capable of sliding along the guide bar 61. The lower carriage 33 has a projection (not shown) projecting toward the guide bar 61, and the guide bar 61 is slidably inserted in the projection.

The flexible disk drive further includes an eject plate 87 and a disk holder 91. The main frame 23, the eject plate 87, and the disk holder 91 are formed by punching, press forming or bending a metallic plate.

The eject plate 87 is mounted on the main frame 23 so as to be capable of sliding along the direction of insertion A of the flexible disk and the direction opposite thereto. As described later, the eject plate 87 holds the flexible disk in cooperation with the disk holder 91 when the flexible disk drive is operated. The eject plate 87 holds the flexible disk in such a manner that the flexible disk can be slid freely along the direction of insertion A in order to enable insertion of the flexible disk into the flexible disk drive along the direction of insertion A, or removal of the flexible disk out of the flexible disk drive along the direction opposite to the direction of insertion A. The eject plate 87 includes a pair of sidewalls 99 facing toward each other. Each sidewall 99 has a pair of cam portions 93. The eject plate 87 has cutout or cutoff portions 95 on the bottom surface along the sidewalls 99, and a substantially U-shaped notch 213 at the center of the bottom surface thereof so as to surround the disk table 17. The eject plate 87 further includes a pin on the lower surface thereof, and the pin engages the locking portion of an eject lever, which will be described later.

The disk holder 91 is disposed on the eject plate 87. The disk holder 91 includes a main surface 97 and a pair of sidewalls 100 formed at both ends of the main surface 97 so as to face toward each other. Each sidewall 100 has a projecting tab 101, however only one of them is shown in the figure. The projecting tabs 101 are inserted into the holes 103 on the main frame 23 through the cutout portions 95 of the eject plate 87. Insertion of the projecting tab 101 into the hole 103 on the main frame 23 allows positioning of the disk holder 91 in the direction of insertion A with respect to the main frame 23 and allows the disk table 17 to reciprocate along the direction B of the revolving shaft 19 of the disk table 17. Each sidewall 100 includes a pair of pins 105. The pins 105 are inserted into the cam portions 93 formed on the sidewall 99 of the eject plate 87. An eject spring 107 is attached between the disk holder 91 and the eject plate 87.

Although the disk holder 91 includes the projecting tab 101 and the main frame 23 has the hole 103 in the example of the related art, it is not limited thereto, and it is also possible to form the projecting tab on the main frame and a hole on the disk holder.

The disk holder 91 has a substantially rectangular opening 109 extending in the direction of the predetermined radial direction C at the center of the underside in the direction of insertion A at the position corresponding to the upper carriage 31 of the carriage assembly 29. The opening 109 is surrounded by a substantially U-shaped convex edge 111 swelling upward from the main surface 97 of the disk holder 91. On the other hand, the carriage assembly 29 has a pair of side arms 113 extending laterally, and the side arms 113 are positioned on the convex edge 111. As described later, in a state in which the flexible disk is ejected from the disk holder 91, the side arms 113 engage the convex edge 111, whereby the pair of upper and lower magnetic heads 27 move away from each other. The disk holder 91 further includes an opening 115 having a shape that allows rotation of a lever portion of the eject lever on the underside in the direction of insertion A, which will be described later.

The main frame 23 has an eject lever 117 rotatably provided in the vicinity of the carriage assembly 29. More specifically, the main frame 23 has a rod-shaped pin 119 projecting upward from the surface thereof. The eject lever 117 includes a cylindrical portion 118 for receiving a rod-shaped pin 119, an arm portion or lever portion 121 extending radially from the cylindrical portion 118, a projection 123 extending upwardly from a free end of the arm portion 121, and an arcuate locking portion 125 extending from the free end of the arm portion 121 in the circumferential direction. The eject lever 117 has an eject lever spring 127 fitted around the cylindrical portion 118. The eject lever spring 127 urges the eject lever 117 counterclockwise in the drawing. The projection 123 of the eject lever 117 is loosely fitted into the opening 115 of the above-described disk holder 91. The projection 123 engages the right upper edge of a shutter of the flexible disk, which will be described later, to control the opening and closing of the shutter. As shown in FIG. 2, a screw 131 is screwed into the extremity of the rod-shaped pin 119, whereby the eject lever 117 is prevented from falling off the rod-shaped pin 119.

The main frame 23 has a front panel 133 attached at the front end thereof. The front panel 133 includes an opening 135 for inserting and removing the flexible disk, and a door 137 for opening and closing the opening 135. The front panel 133 includes an eject button 141 projecting outward so as to be movable in the fore-and-aft direction. The eject button 141 is fitted into a projection 143 projecting forward from the front end of the eject plate 87.

Figure 3:
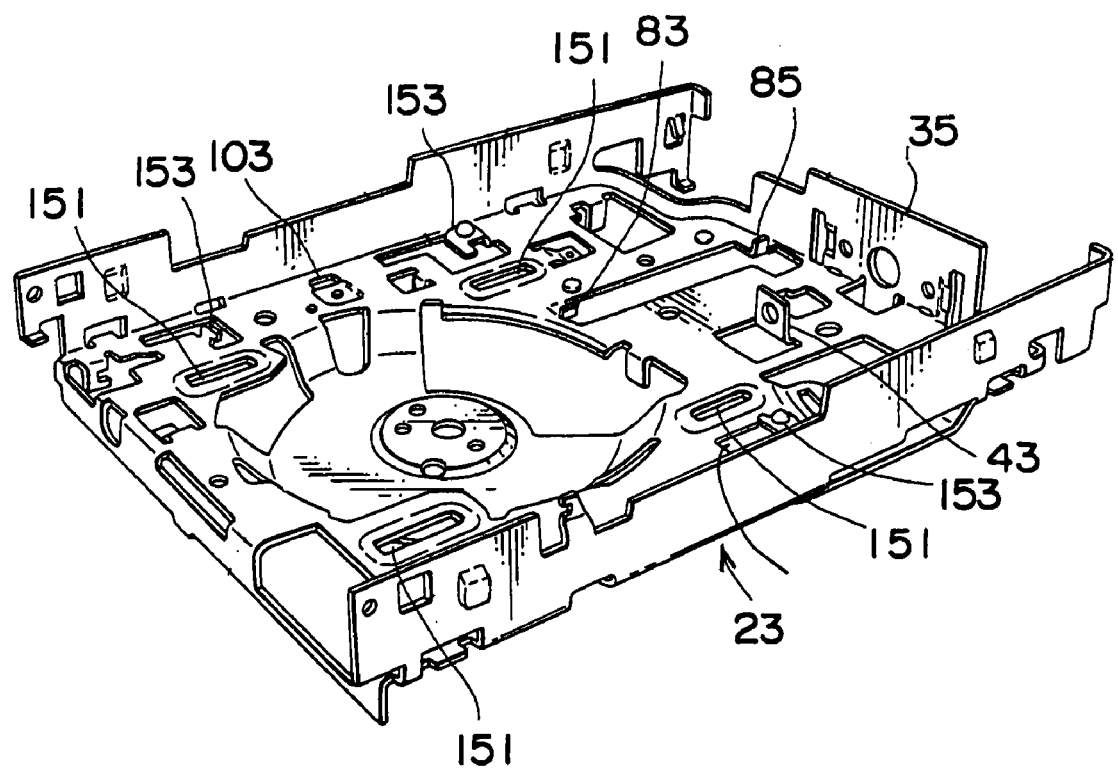
FIG. 3 is a perspective view of a main frame used for the flexible disk drive shown in FIG. 1.
Figure 4:
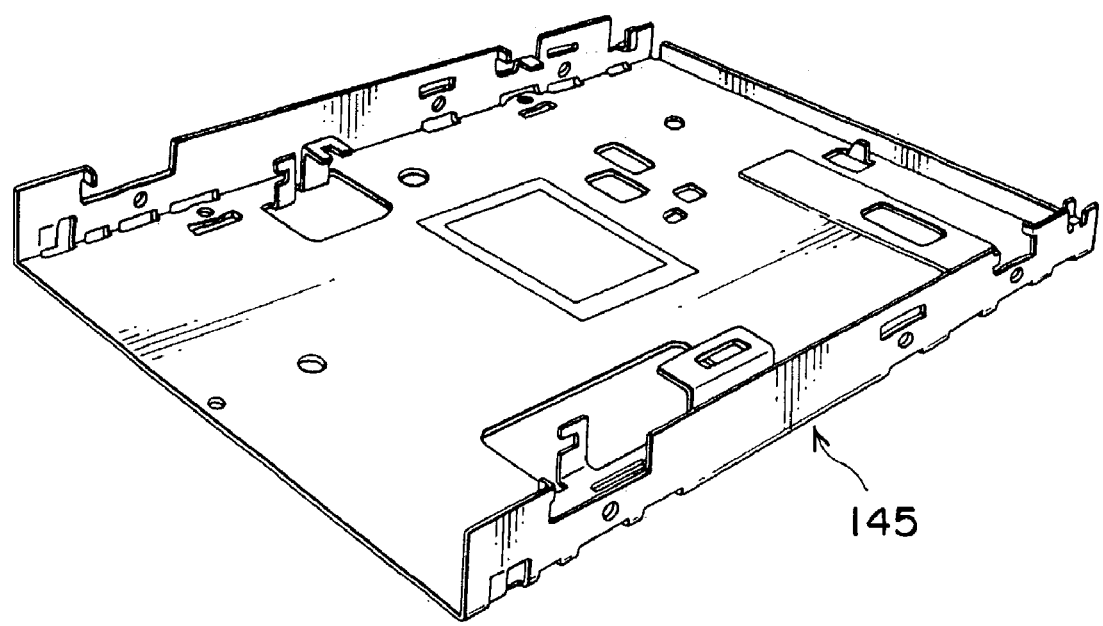
FIG. 4 is a perspective view of a lower cover or a lower lid covering the lower surface or bottom surface of the main frame shown in FIG. 3.
Figure 5:
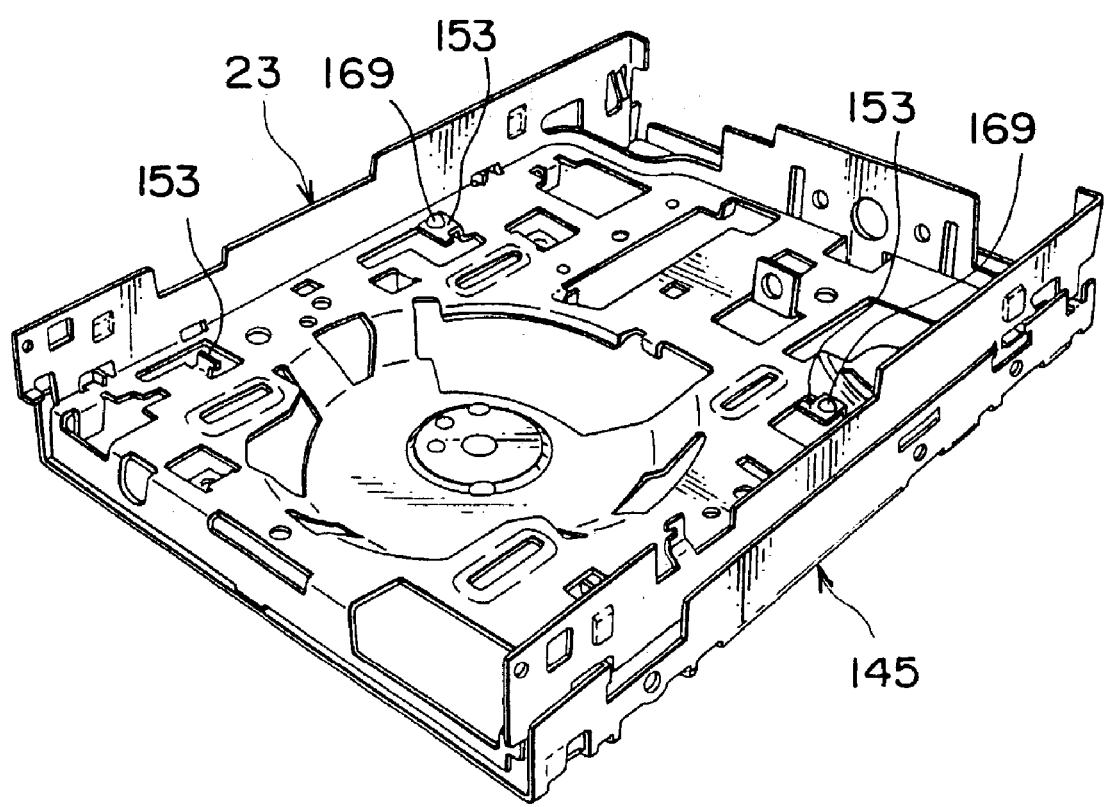
FIG. 5 is a perspective view showing a state in which the main frame shown in FIG. 3 is assembled with the lower cover shown in FIG. 4.

Referring now to FIG. 3 to FIG. 5, the frame structure of the above-described flexible disk drive in the related art will be described.

In the flexible disk drive in the related art, the dimensions of the main frame 23 are limited because of the space required for a medium 147 (shown in FIG. 7), the carriage assembly 29, and an I/F connector. In other words, the main frame 23 in the related art includes the carriage assembly 29, the stepping motor 37, the spindle assembly 25, an eject mechanism, the printed circuit board, and an external component mounting structure mounted thereon. Therefore, the shape (dimensions) of the main frame 23, functioning as a base member, must be large enough to cover the entire surface of the flexible disk drive product. For example, the size (dimensions) of the main frame 23 in the related art is about 150 mm×100 mm×20 mm in length×width×height. The thickness of the main frame 23 is about 1 mm.

From the view point of reducing costs (performing cost engineering) of the design, the amount of material used should be reduced to save material costs. However, in such a case, the main frame 23 cannot be reduced in size due to the space required for the aforementioned components. In addition, since the media 147 must be received in the main frame 23, the main frame 23 must have a certain size.

A lower cover 145 in the related art only has a function of covering the lower surface of the main frame 23.

Figure 6:
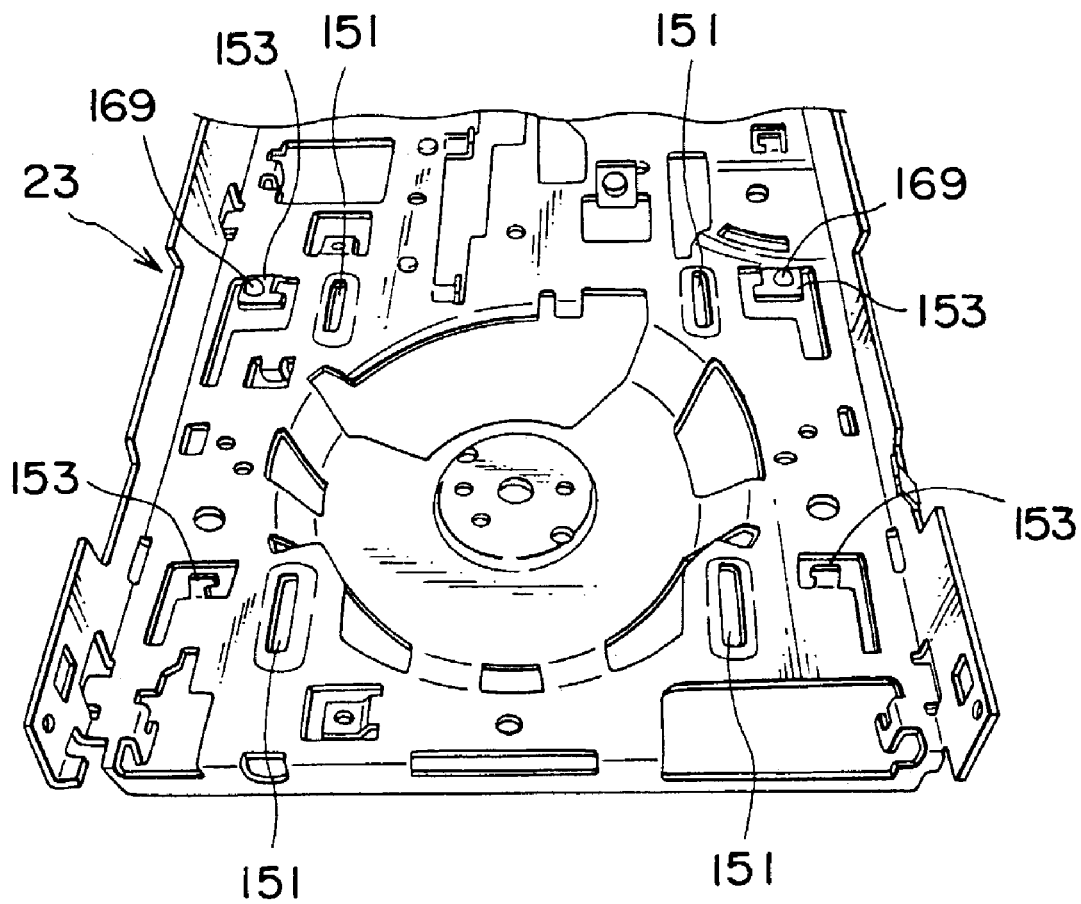
FIG. 6 is a perspective view of the main frame shown in FIG. 3 when viewed obliquely from above and in front.

As shown in FIG. 6, the main frame 23 has projections 151 at four positions for slidably mounting the eject plate 87 thereon. Therefore, sagging or deformation of the eject plate 87 due to impact does not occur.

In addition, as shown in FIG. 5, the main frame 23 includes all of the guides for the sliding movement of the eject mechanism. In other words, the main frame 23 includes slide guides 153 at four positions, each having a structure corresponding to the shape of the eject plate 87 that slides in the main frame.

Figure 7:
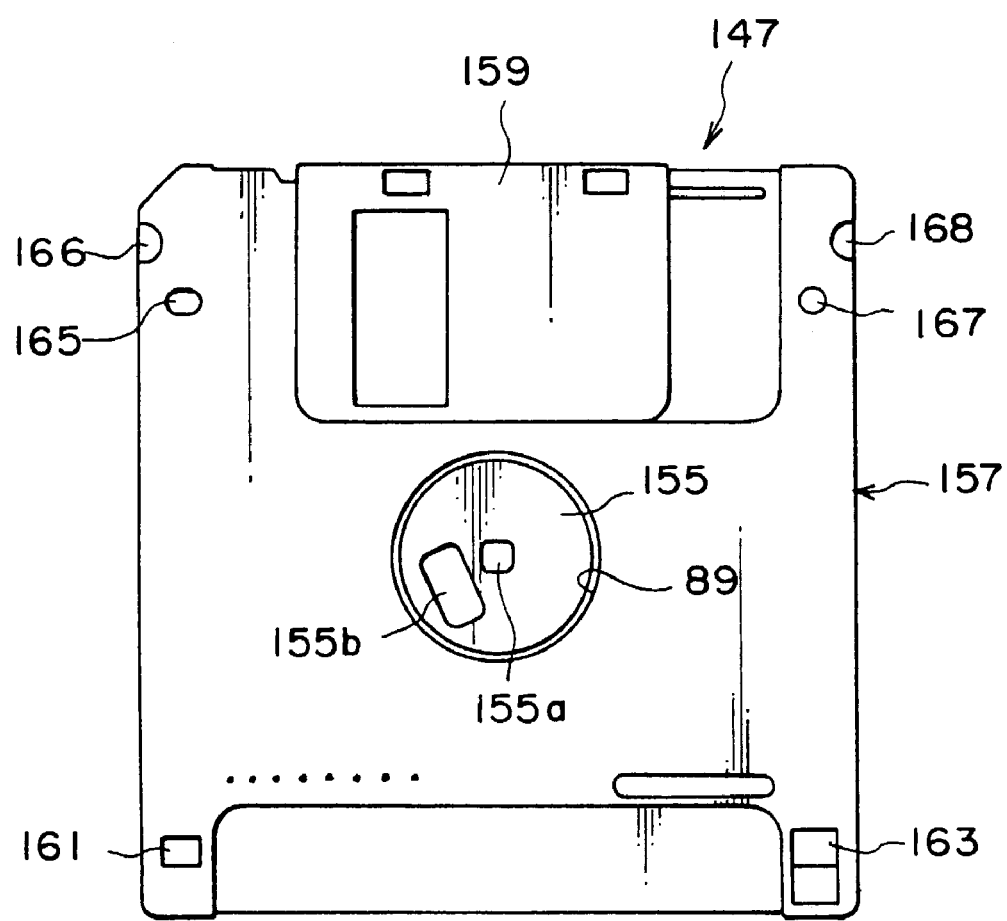
FIG. 7 is a back view of the flexible disk in the related art.

As shown in FIG. 7, the flexible disk 147 includes a flexible disk body having a disk hub 155 for rotation at the center thereof, and a case for accommodating the flexible disk body. The case includes a case body 157, and a shutter 159 at the center on one side of the case body 157. The shutter is slidable in both lateral directions and covers a window for recording. The disk hub 155 is exposed from a circular hole 89 of the case body 157 and has a center hole 155*a* and a driving rectangular hole 155*b* which are engaged to the projections of the turn table for rotating. The case body 157 has half-circular notches 166 and 168 and positioning holes 165,167 near the half-circular notches 166 and 168 on both sides of one end portion of the case body 157. The case body 157 includes a capacity identification hole 161 on one side of the other end portion opposite to the end portion of the case body 157 and a write protection mechanism 163 on the other side of the other end portion. One of the positioning holes 165 and 167 has a circular shape and the other one has an oval shape. Reference numerals 166 and 168 designate notches having a semi-circular bottom.

Figure 8A:
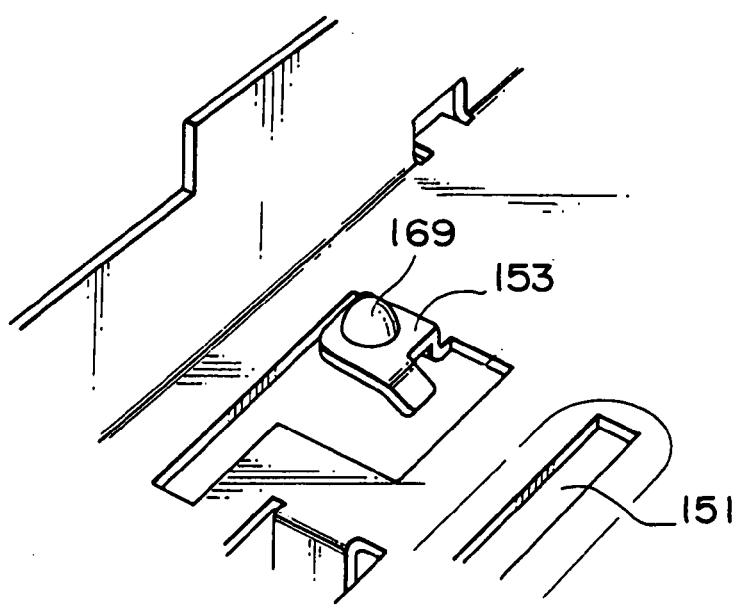
FIGS. 8A and 8B are perspective views showing a dowel for positioning the flexible disk formed on the main frame in the related art.
Figure 8B:
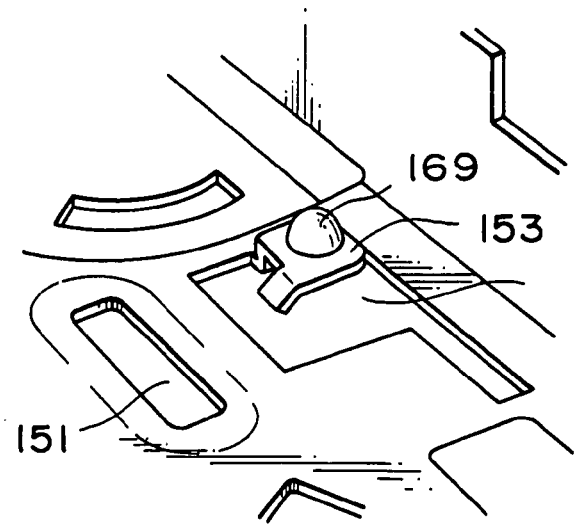

Referring now to FIGS. 8A and 8B, the positioning dowels 169 have a hemispherical shape, and are formed on the slide guides 153 provided on the rear side of the main frame 23 by an steel plate drawing process.

Referring now to FIGS. 9 to 15, an embodiment of the invention will be described in detail.

Figure 9:
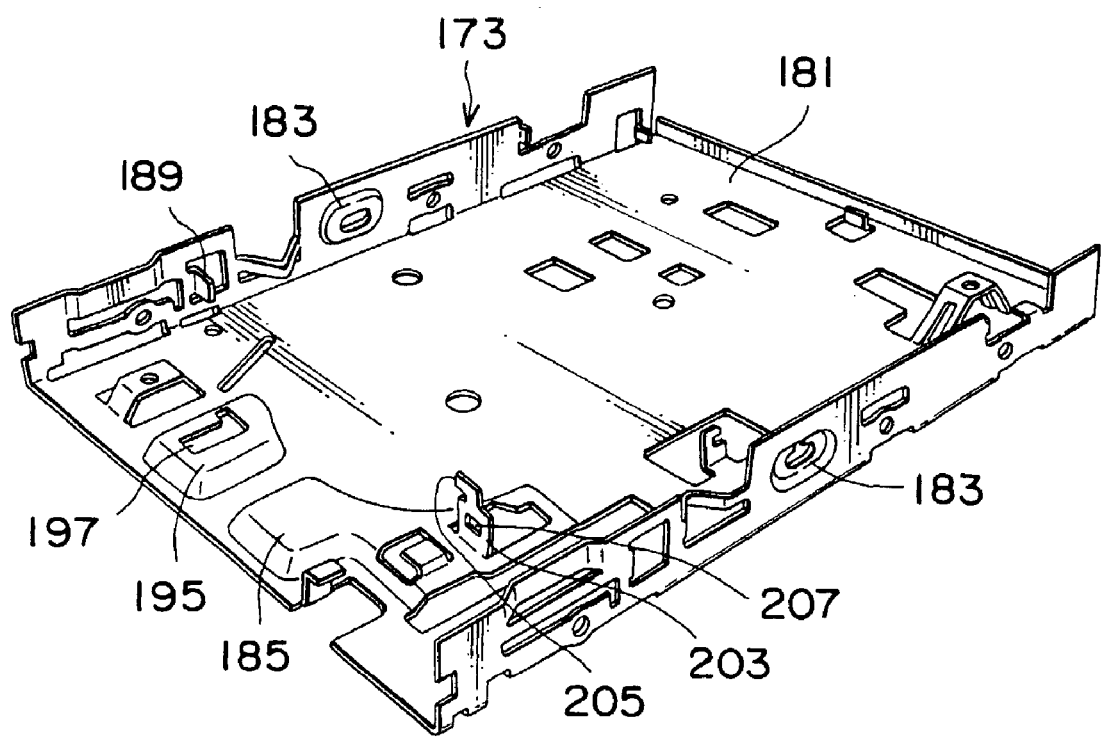
FIG. 9 is a perspective view of the lower cover (lower lid) for covering the lower surface or bottom surface of the main frame used for the flexible disk drive according to an embodiment of the invention.
Figure 10:
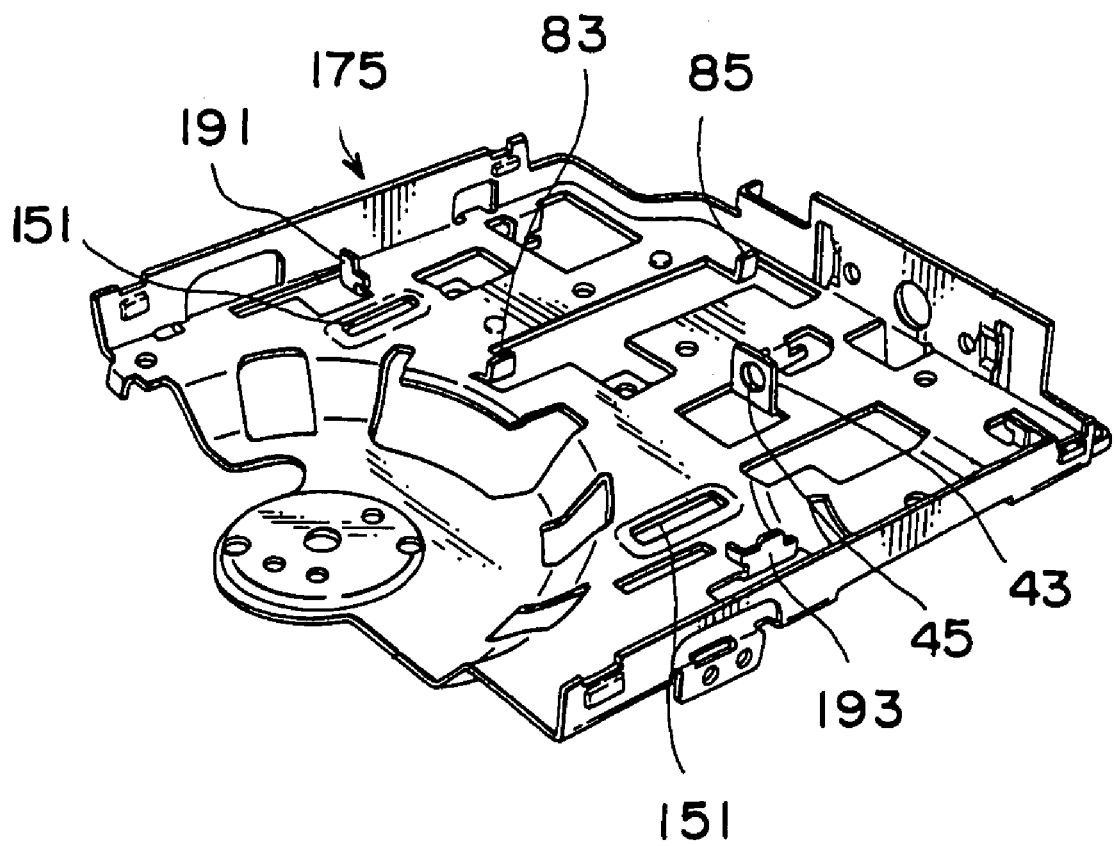
FIG. 10 is a perspective view of the main frame covered by the lower cover shown in FIG. 9.
Figure 11:
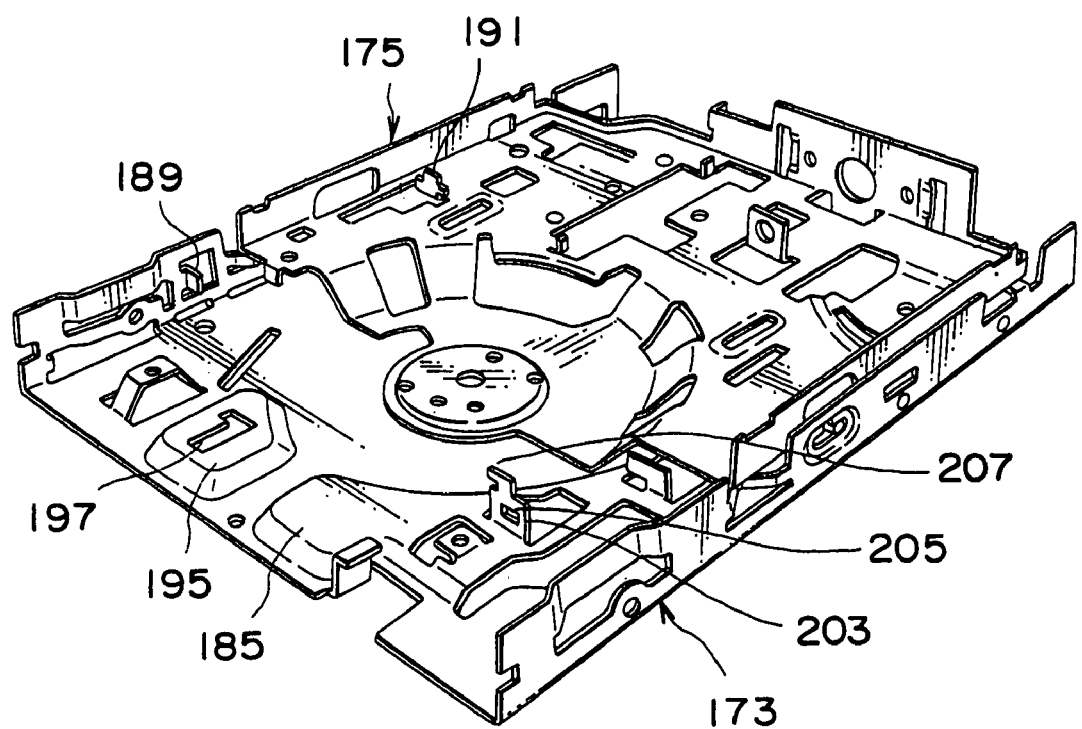
FIG. 11 is a perspective view showing a state in which the main frame shown in FIG. 10 is assembled with the lower cover shown in FIG. 9.

Referring now to FIGS. 9 to 11, a frame structure for a flexible disk drive according to one embodiment of the invention will be described.

As most clearly shown in FIG. 10, a main frame 175 has dimensions for accommodating only the carriage assembly 29 (FIG. 1) for holding the magnetic head 27 (FIG. 1), the stepping motor 37 (FIG. 1) for sliding the carriage assembly 29 in the direction along the predetermined radial direction C, and a portion of the spindle assembly 25 (FIG. 1) for rotating the inserted flexible disk 147 (FIG. 7) corresponding to substantially one half of the entire portion thereof. In other words, the main frame 175 has a structure in which the front portion of the frame is eliminated.

The carriage assembly 29, the stepping motor 37, and the spindle assembly 25 are components requiring a relatively high degree of accuracy (hereinafter referred to as "highly accurate components") for exhibiting the functions thereof (for maintaining the characteristics thereof) among the components constituting the flexible disk drive. In this embodiment, such highly accurate components are mounted on the main frame 175.

In this manner, since the front portion of the frame of the main frame 175 (the portion on the side of the front panel with respect to the central portion of a motor frame portion 16) is removed, the amount of material used may be reduced, and thus reduction of material costs is realized. The dimensions (size) of the main frame 10 shown in the drawing are about 80 mm×100 mm×10 mm in vertical dimension (length)×width×height, respectively. In other words, the main frame 175 in the present embodiment (FIG. 10) is about half the main frame 23 in the related art (FIG. 1) in length and height. By reducing the heights of both sides of the main frame 175 and reducing the thickness of the plate from 1 mm in the related art to 0.8 mm, the material costs may be reduced.

Since the front structure of the frame in the main frame 175 is removed, the removed portion has to be compensated for in some way. Therefore, as described later, in the invention, the lower cover 173 functions as a sub-frame, which corresponds to the function of the removed front portion of the frame. The function that corresponds to the function of the removed front portion of the frame includes a slide guide structure of the eject mechanism. The slide guide structure of the eject mechanism is a component that may have relatively low accuracy for exhibiting its function (maintaining its characteristics) among the components that constitute the flexible disk drive (hereinafter referred to as a "low accurate component").

Figure 12:
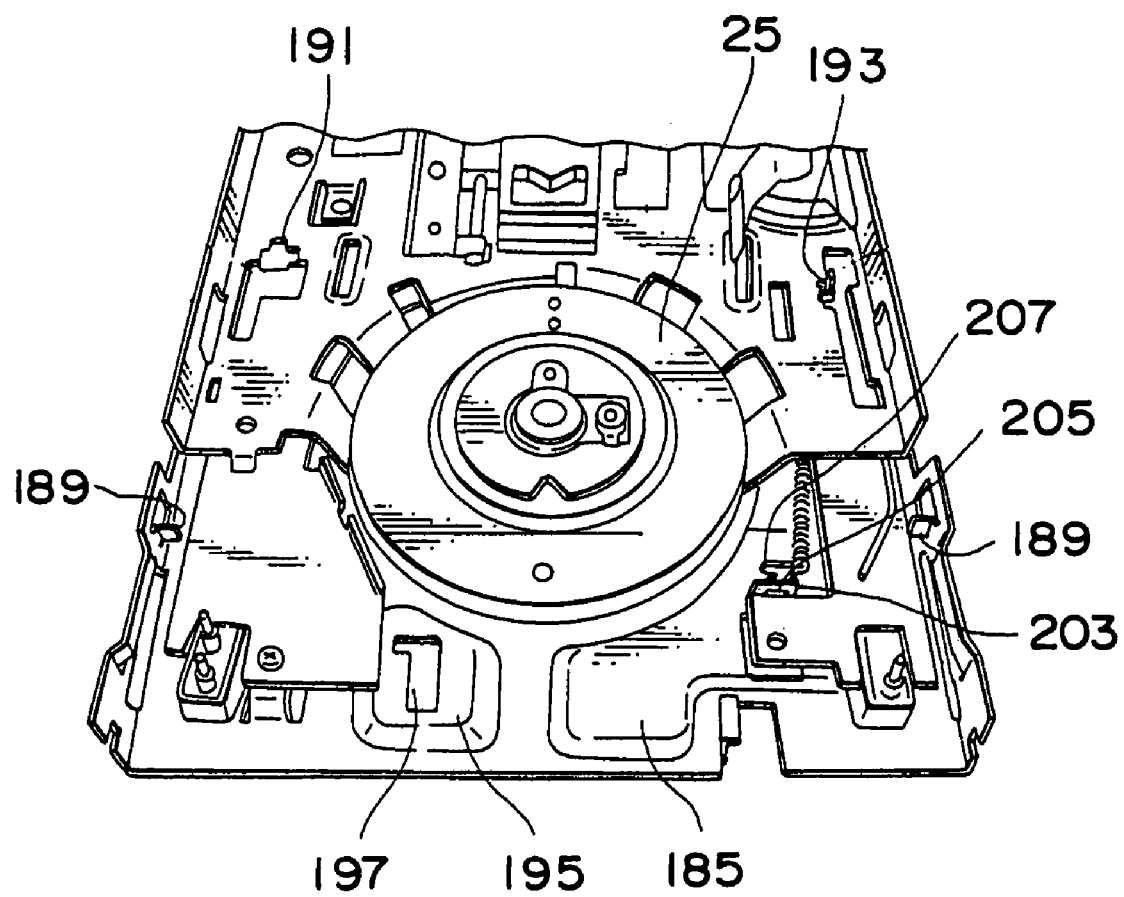
FIG. 12 is a perspective view of the state shown in FIG. 11 and a state in which a spindle motor is further assembled thereon, when viewed obliquely from above and in front.
Figure 13:
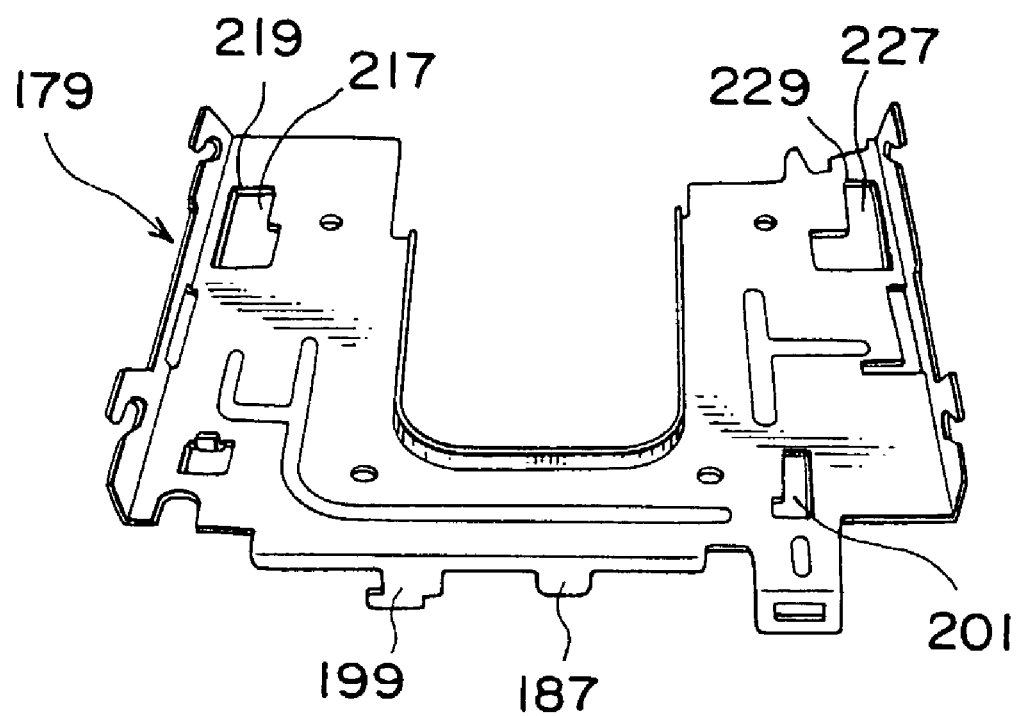
FIG. 13 is a perspective view of an eject plate slidably held on the main frame shown in FIG. 12, viewed obliquely from above and in front.

Referring to FIGS. 12 and 13, an eject plate 179 is slidably supported on the main frame 175. As described above, since the main frame 175 does not have the structure that corresponds to the front portion of the frame, sagging or deformation of the eject plate 179 due to impact cannot be prevented only by mounting the eject plate 179 on the main frame 175. Therefore, in the invention, a device for preventing problems during ejection due to deformation of the eject plate 179 is provided on the lower cover 173, which serves as a sub-frame, and on the eject plate 179.

More specifically, the lower cover 173 includes a main surface 181 and a pair of sidewalls 183 formed on both sides of the main surfaces 181 so as to face toward each other. The main surface 181 has a first convex portion 185 projecting upward on the front portion thereof. On the other hand, the eject plate 179 has a first projection 187 projecting downward from the front end thereof. The first projection 187 is disposed above the first convex portion 185 of the lower cover 173 at a small distance therefrom. In other words, when the eject plate 179 is sliding, the first projection 187 moves over the first convex portion 185 at a certain distance therefrom. On the other hand, the pair of sidewalls 183 of the lower cover 173 includes a pair of side stoppers 189 formed by cutting and bending them inward toward each other. The eject levers provided on both sides of the eject plate 179 slide over the pair of side stoppers 189.

In this manner, since the lower cover 173 includes the first convex portion 185 and the pair of side stoppers 189 and the eject plate 179 includes the first projection 187, sagging or deformation of the eject plate 179 caused by impact may be prevented.

Referring now to FIGS. 12 and 13, a slide guide structure for the eject mechanism in the present embodiment according to the present invention will be described.

As described above, since the main frame 175 does not have a structure corresponding to the front portion of the frame, the slide guides indicated by reference numerals 191 and 193 can only be formed at two points on the main frame 175. Therefore, it is necessary to provide the slide guide structure for the eject mechanism at the two missing points.

As shown in FIG. 12, the main surface 181 of the lower cover 173 includes a second convex portion 195 swelling upward on the left side near the center of the front portion. The second convex portion 195 includes an L-shaped opening 197 extending in the direction of insertion A. On the other hand, as shown in FIG. 13, the eject plate 179 includes a second projection 199 projecting downward at the front end thereof. The second projection 199 includes an extremity abutted against the second convex portion 195 of the lower cover 173 and an L-shaped hook portion inserted into an L-shaped opening 197. In other words, the combination of the second convex portion 195 and the second projection 199 constitutes a slide guide structure.

As shown in FIG. 13, the eject plate 179 includes an L-shaped opening 201 extending in the direction of insertion A on the right side of the front portion of the bottom surface. On the other hand, as shown in FIG. 11, the main surface 181 of the lower cover 173 includes a bent portion 203 formed by cutting and raising upward the right side of the front portion thereof. The bent portion 203 includes a shoulder 205 abutted against the lower surface of the eject plate 179, and an L-shaped hook portion 207 inserted into the L-shaped opening 201. In other words, the combination of the L-shaped opening 201 of the eject plate 179 and the bent portion 203 constitutes another slide guide structure.

In this manner, according to the present embodiment, the combination of the main frame 175 and the sub-frame of the lower cover 173 functions as one frame.

Figures 14A, 14B:
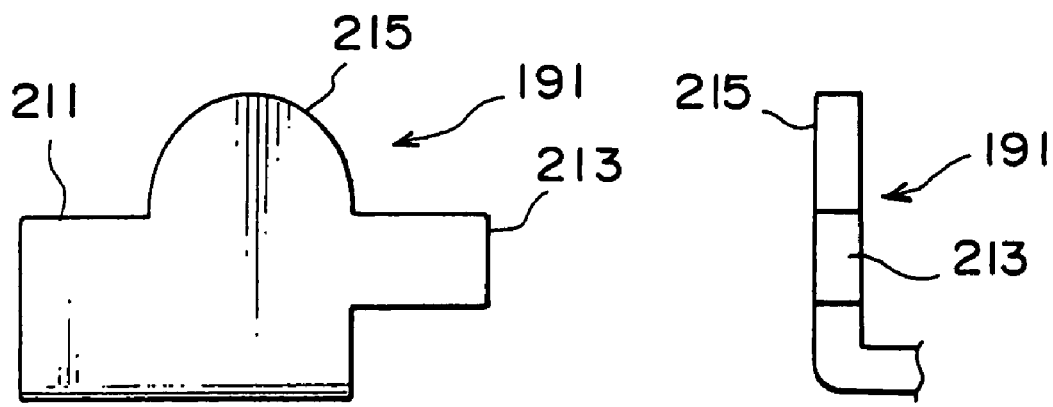
Figure 14C:
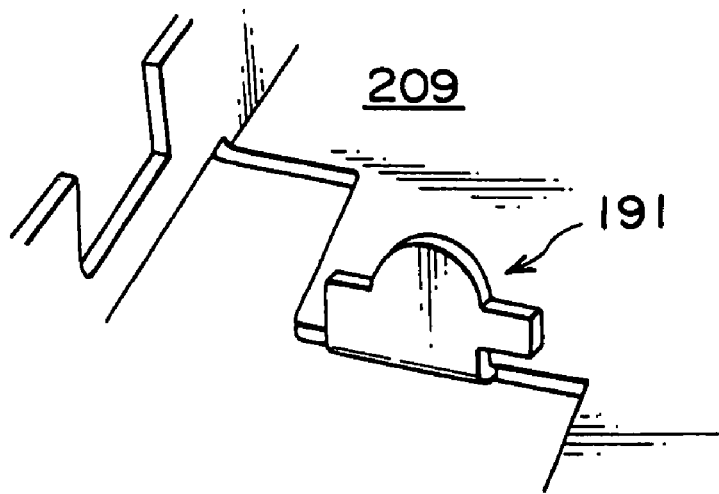

Referring now to FIGS. 14A to 14C, a projection 191 is formed by cutting and raising when the main frame 175 shown in FIG. 10 is formed as a positioning mechanism.

The projection 191 is formed by cutting and raising, that is, by so called lateral bending, so as to extend upright from a bottom plate 209 of the main frame 175 and along the lateral direction, that is, so as to form a plane at right angles to the direction of insertion of the flexible disk.

The projection 191 includes a rectangular base portion 211, a guide strip 213 extending upward from one side of the base portion, and a semi-circular head portion 215 provided at the upper edge.

The movement of the eject plate 179 in the fore-and-aft direction is guided by sliding contact between the lower portion of the guide strip 213 and the inner portion 219 of the guide hole 217 of the eject plate 179 shown in FIG. 13.

The head portion 215 is fitted into the positioning hole 167 on the flexible disk 147 shown in FIG. 7 to position the flexible disk 147 in the direction of insertion and the direction orthogonal to the direction of insertion (direction of width) of the flexible disk.

Referring now to FIGS. 15A to FIG. 15C, a projection 193 is formed by cutting and raising when the main frame 175 shown in FIG. 10 is formed as a positioning mechanism.

The projection 193 is formed by cutting and raising operation, that is, by so called vertical bending, so as to extend upright from the bottom plate 209 of the main frame 175 and along the fore-and-aft direction, that is, in the direction of insertion of the flexible disk.

The projection 193 includes a rectangular base portion 221, a guide strip 223 extending upward from one side of the base portion, and a semi-circular head portion 225 provided at the upper end thereof.

The movement of the eject plate 179 in the fore-and-aft direction is guided by sliding contact between the lower portion of the guide strip 223 and the inner portion 229 of the guide hole 227 of the eject plate 179 shown in FIG. 13.

The head portion 225 is fitted into the positioning hole 165 of the flexible disk 147 shown in FIG. 7 to position the flexible disk in the direction of insertion.

According to the embodiment of the invention described thus far, the projections 191 and 193 may be formed by performing bending when performing punching pressing of an iron plate for manufacturing the main frame 175. Therefore, the press forming of the positioning mechanism may be facilitated, and thus the stability may be improved while securing the positioning accuracy of the flexible disk, as in the related art.

As is clear from the description given above, the present invention provides a positioning mechanism that can be processed easily and accurately by press forming, a main frame having the same, and a method of manufacturing the same.

What is claimed is:

1. A flexible disk drive for driving a flexible disk that is insertable and removable in a predetermined direction in the flexible disk drive, wherein the flexible disk includes a case body which has a first positioning hole elongated in a direction orthogonal to the predetermined direction and a second positioning hole that is substantially circular, said flexible disk drive comprising:

a main frame;

a lower cover for covering a lower surface of the main frame; and an eject plate that is slidable with respect to the main frame, wherein the main frame comprises first and second projections adapted to be fitted to the first and the second positioning holes, respectively, and each of the first and the second projections is formed by a plate piece extending upright from a bottom plate of the main frame;

wherein the plate piece forming the first projection is formed in a plane extending along the predetermined direction, and the plate piece forming the second projection is formed in a plane at substantially a right angle to the predetermined direction;

wherein the plate piece forming the first projection comprises a head portion that is adapted to be fitted into the first positioning hole so as to position the flexible disk along the predetermined direction; and wherein the plate piece forming the second projection comprises a head portion that is adapted to be fitted into the second positioning hole so as to position the flexible disk in the predetermined direction and the direction orthogonal to the predetermined direction.

2. A flexible disk drive according to claim 1, wherein each of the head portions is semi-circular.

3. A flexible disk drive according to claim 1, wherein each of the first and the second projections comprises a guide portion for guiding sliding movement of the eject plate in the predetermined direction.

4. A flexible disk drive according to claim 1, further comprising:

a disk ejecting mechanism for ejecting the flexible disk inserted in the flexible disk;

a turn table formed on the mainframe for rotating a disk in the inserted flexible disk; and a magnetic head assembly provided movably on the main frame to be movable in a direction along a radius of the disk for magnetic recording and reading of information with respect to the disk.

* * * * *